United States Patent
Arguello et al.

(10) Patent No.: US 10,722,324 B2
(45) Date of Patent: Jul. 28, 2020

(54) ADAPTER FOR A TAILPIECE FOR A DENTAL VALVE

(71) Applicant: Stoma Ventures, LLC, Chesterfield, MO (US)

(72) Inventors: Edward Arguello, Weston, FL (US); Charles Thomas, Vero Beach, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 277 days.

(21) Appl. No.: 15/864,112

(22) Filed: Jan. 8, 2018

(65) Prior Publication Data
US 2019/0209265 A1    Jul. 11, 2019

(51) Int. Cl.
A61C 17/08   (2006.01)
A61C 17/06   (2006.01)
A61C 1/00    (2006.01)

(52) U.S. Cl.
CPC ............ *A61C 1/0061* (2013.01); *A61C 17/06* (2019.05); *A61C 17/08* (2019.05)

(58) Field of Classification Search
CPC ..... A61C 1/0061; A61C 17/04; A61C 17/043; A61C 17/02; A61C 17/08; A61C 3039/1027; B29C 66/12861; B29C 66/30321; B29C 66/5221; A61M 39/10; A61M 1/0086; F16L 33/2071; F16L 5/10; F16L 17/032; F16L 25/14
USPC ....... 433/82–96; 604/19, 22, 35, 93.01, 173, 604/542, 902; 285/148.16, 239, 256, 259, 285/95, 235, 237; 277/630, 637, 314, 277/315, 602, 603, 607, 608, 612, 613, 277/615, 626
See application file for complete search history.

(56) References Cited

U.S. PATENT DOCUMENTS

| | | | | |
|---|---|---|---|---|
| 5,135,268 A * | 8/1992 | McNaughton | .......... | F16L 33/30 285/239 |
| 5,317,799 A * | 6/1994 | Chapman | ............ | F16L 33/2076 285/256 |
| 5,653,475 A * | 8/1997 | Scheyhing | ......... | B60H 1/00571 285/305 |
| 5,954,345 A * | 9/1999 | Svoboda | ............... | F16H 57/029 16/2.3 |
| 6,561,550 B1 * | 5/2003 | Kiraz | ....................... | F16L 33/30 285/239 |
| 7,234,732 B2 * | 6/2007 | Ball | ....................... | F16L 13/161 285/148.19 |
| 7,407,165 B1 * | 8/2008 | Chisnell | .................. | F16L 21/02 277/603 |
| 7,503,588 B2 * | 3/2009 | Nilsen | ................... | F16L 33/227 285/238 |
| 7,802,798 B2 * | 9/2010 | Beele | ........................ | F16L 5/04 277/607 |

(Continued)

*Primary Examiner* — Edward Moran
*Assistant Examiner* — Matthew P Saunders
(74) *Attorney, Agent, or Firm* — David H. Chervitz

(57) ABSTRACT

An adapter for a tailpiece for a dental valve is disclosed which has a body having an exterior surface, a valve receiving end, a tailpiece receiving end, a lumen formed between the valve receiving end and the tailpiece receiving end, the lumen having an interior surface, an interior annular groove formed in the interior surface, and an exterior annular rib formed in the exterior surface, with the exterior annular rib being positioned near the tailpiece receiving end and the interior annular channel being positioned near the valve receiving end.

20 Claims, 8 Drawing Sheets

(56) References Cited

U.S. PATENT DOCUMENTS

| | | | | |
|---|---|---|---|---|
| 7,918,486 B2* | 4/2011 | Preisendorfer | ....... | F16L 41/088 |
| | | | | 285/216 |
| 7,971,912 B2* | 7/2011 | Okada | ................. | F16L 37/0987 |
| | | | | 285/319 |
| 8,262,094 B2* | 9/2012 | Beele | ........................ | F16L 5/10 |
| | | | | 277/607 |
| 8,523,242 B2* | 9/2013 | Hosotani | ................. | F16L 33/30 |
| | | | | 285/239 |
| 9,476,529 B2* | 10/2016 | Kury | ................... | F16L 33/2071 |
| 9,598,200 B2* | 3/2017 | Lee | ...................... | B65D 45/325 |
| 10,422,427 B2* | 9/2019 | Beele | ...................... | F16J 15/02 |
| 2006/0012168 A1* | 1/2006 | Poirier | .................... | F16L 33/18 |
| | | | | 285/239 |
| 2013/0264821 A1* | 10/2013 | Duck | ...................... | F16L 37/02 |
| | | | | 285/397 |
| 2014/0170595 A1 | 6/2014 | Williams et al. | | |
| 2014/0239551 A1 | 8/2014 | Williams et al. | | |
| 2016/0015477 A1* | 1/2016 | Ellis | ....................... | A61C 17/08 |
| | | | | 433/95 |

* cited by examiner

ADAPTER FOR A TAILPIECE FOR A DENTAL VALVE

BACKGROUND

This disclosure relates to an adapter for a tailpiece for a dental instrument and more particularly to an adapter for a tailpiece used in conjunction with a dental valve device for a high volume evacuator or a low volume evacuator (saliva ejector).

During a dental procedure it is important to be able to remove saliva, blood, tooth fragments, metals, and other debris from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector. A saliva ejector typically comprises a plastic flexible tube or tip for placement in the mouth of a patient. The saliva ejector tip is connected to a valve and the valve is connected to a hose or to a tailpiece that is connected to the hose. The hose is connected to a source of vacuum. In this manner, saliva is passed through the ejector tip, the valve, the tailpiece, and the hose to be disposed of in a sanitary manner. Once the procedure is completed, the ejector tip should be discarded and the valve should be replaced. The used valve should also be sterilized by autoclaving to be used again. Although it is suggested to autoclave the valve after use, it is known that autoclaving is hardly ever done. Another device that is capable of removing solid materials is a high volume evacuator system. A high volume evacuator system generally consists of a tube or tip that may be inserted into a mouth of a patient with the tube connected to a valve which is connected to a tailpiece with the tailpiece being connected to a hose or tubing that is in fluid communication with a source of vacuum. Again, in this manner, debris may be removed from the mouth of the patient. After the dental procedure, the tip is disposed of and the valve should be replaced. The used valve should also be sterilized by autoclaving to be used again. However, although it is suggested to sterilize the valve after use, it is known that this suggested procedure is hardly ever followed. As can be appreciated, the saliva ejector and the high volume evacuator are used to remove liquids and debris from a mouth of a patient to prevent a patient from swallowing or aspirating liquids and debris produced during a dental procedure.

As indicated, the saliva ejector dental valve or the high volume evacuator dental valve is connected to the suction hose by use of a tailpiece. Each of the valves has an end that is mated to the tailpiece. The ends are of various sizes and shapes and are not uniform or universal. In order to connect the end of the valve to a tailpiece, a specifically sized and shaped tailpiece is required to be used. As can be appreciated, a dental procedure may require various dental valves. After a dental procedure if the valves are to be cleaned then a technician must keep track of what tailpiece is in place and what specific valve needs to be inserted onto the tailpiece. This will require the inventory of various valves and tailpieces.

Although these tailpieces and dental valves are beneficial, one disadvantage associated with their use is that there is no standardization available for the tailpieces and the dental valves. For example, one manufacturer may produce a dental valve that has a tailpiece receiving end of one configuration and another manufacturer may produce a dental valve having a tailpiece receiving end of different dimensions or a different configuration. Mating these different valves to a tailpiece may be difficult, if not impossible. Another problem associated with the use of different tailpieces and dental valves is that a technician will be required to keep track of the various tailpieces and dental valves that are used and stored. If an error occurs in the use or storage of such devices then a dental station may not be able to be used for a dental procedure. For example, if a dental office runs out of clean dental valves of a certain size and shape that will fit onto a specific tailpiece then a saliva ejector may not be available for a dental procedure. If this were to occur then a scheduled dental procedure would have to be canceled. Further, in a single station dental practice, it may be necessary to cancel many appointments. Also, in a very busy dental practice, having one station out of commission for a period time may also require that several appointments will have to be canceled and rescheduled. As can be appreciated, this will result in lost revenue for the dental practice and should be avoided. Also, if there is a dental emergency then the dentist may not be able to provide emergency services.

Another problem that may occur is that during a dental procedure a dental valve may fail and may need to be replaced. If this were to happen then a technician would be required to replace the defective dental valve with a dental valve of the same size and shape. If a mismatched dental valve was selected then the technician would have to find a suitable replacement dental valve. As can be appreciated, this could delay the dental procedure and at worst cancel the dental procedure if an appropriate replacement could not be found. Any of these situations should be avoided especially when a dental procedure is in progress.

Therefore, it would be desirable to have an adapter for a tailpiece for a dental valve that is used to connect or mate a dental valve to a tailpiece that is connected to a hose that is connected to a source of vacuum. It would also be desirable to have an adapter for a tailpiece that is universal and may be used to connect any sized dental valve to a tailpiece. It would also be advantageous to have an adapter for a tailpiece for a dental valve that is disposable for a single use to prevent contamination.

BRIEF SUMMARY

In one form of the present disclosure, an adapter for a tailpiece for a dental valve comprises a body having an exterior surface, a valve receiving end, a tailpiece receiving end, a lumen formed between the valve receiving end and the tailpiece receiving end, the lumen having an interior surface, an interior annular groove formed in the interior surface, and an exterior annular rib formed in the exterior surface, with the exterior annular rib being positioned near the tailpiece receiving end and the interior annular channel being positioned near the valve receiving end.

In another form of the present disclosure, an adapter for a tailpiece for a dental valve comprises a body having an exterior surface, a valve receiving end, a tailpiece receiving end, a lumen formed between the valve receiving end and the tailpiece receiving end, the lumen having an interior surface, an interior annular rib formed in the interior surface, and an exterior annular rib formed in the exterior surface, with the exterior annular rib being positioned near the tailpiece receiving end and the interior annular rib being positioned near the valve receiving end.

In yet another form of the present disclosure, a tailpiece for a dental valve comprises a body having an exterior surface having a first exterior ring section, an exterior annular rib, and a second exterior ring section, a valve receiving end having an annular lip having a valve engaging surface, a tailpiece receiving end having a chamfered portion, a lumen formed between the valve receiving end and the tailpiece receiving end, the body having an interior surface having annular chamfered portion, a first interior ring section, an interior annular groove formed in the interior surface, and a second interior ring section, with the exterior annular rib being positioned near the tailpiece receiving end and the interior annular groove being positioned near the valve receiving end.

The present disclosure provides an adapter for a tailpiece for a dental valve that allows any sized and shaped dental valve to be mated to a tailpiece.

The present disclosure provides an adapter for a tailpiece for a dental valve that is easy to install in a dental valve and a tailpiece.

The present disclosure provides an adapter for a tailpiece for a dental valve that is small, lightweight, easy to handle, easy to install, and easy to use.

The present disclosure also provides an adapter for a tailpiece for a dental valve which is of simple construction and design and which can be easily employed with highly reliable results.

The present disclosure is also directed to an adapter for a tailpiece for a dental valve that does not require any special tools to attach the adapter between the tailpiece and the dental valve.

The present disclosure is related to an adapter for a tailpiece for a dental valve that can be connected to a disposable dental valve device.

The present disclosure provides an adapter for a tailpiece for a dental valve that may be disposable for a single use or dental operation.

The present disclosure is also directed to an adapter for a tailpiece for a dental valve that is made of a lightweight material such as plastic, polyethylene, and high density polyethylene or any other similar material so that the adapter may be disposable.

The present disclosure is related to an adapter for a tailpiece for a dental valve that may be used to allow dental valves of various sizes to be easily mated to a tailpiece.

The present disclosure also provides an adapter for a tailpiece for a dental valve that may have incorporated therein or coated thereon an antimicrobial agent or chemical further cross-contamination when using the adapter.

These and other advantages of the present disclosure will become apparent after considering the following detailed specification in conjunction with the accompanying drawings, wherein:

DETAILED DESCRIPTION OF PREFERRED EMBODIMENTS

Figure 1:
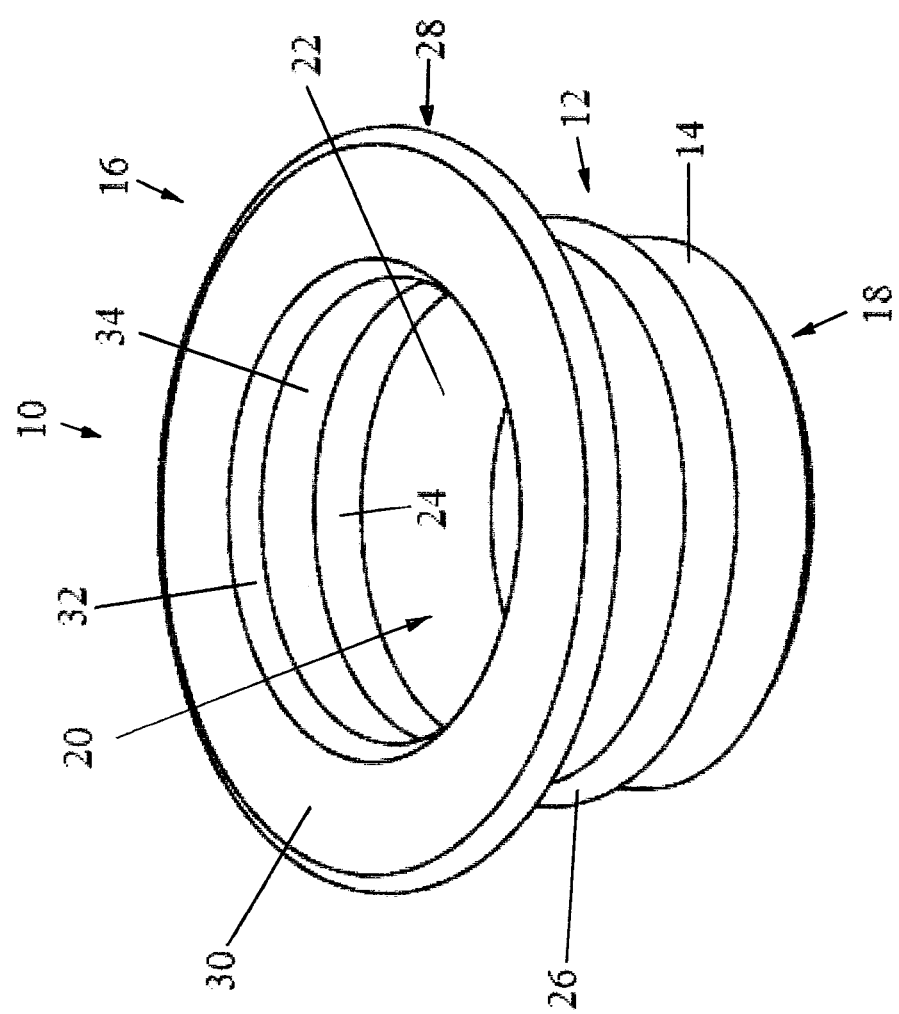
FIG. 1 is a perspective view of an adapter for a tailpiece for a dental valve constructed according to the present disclosure.

Referring now to the drawings, wherein like numbers refer to like items, number 10 identifies an adapter for a tailpiece for a dental valve for use with a dental system constructed according to the present disclosure. With reference now to FIG. 1, the adapter 10 comprises a body 12 having an exterior surface 14, a valve receiving end 16, a tailpiece receiving end 18 with a lumen or channel 20 formed between the valve receiving end 16 and the tailpiece receiving end 18. The channel 20 allows any liquid, saliva, blood, tooth fragments, or other debris to flow there through. The adapter 10 also has an interior surface 22 having an interior annular groove 24 formed in the interior surface 22. An exterior annular rib or ridge 26 is formed around the exterior surface 14. The exterior annular rib 26 is positioned near the tailpiece receiving end 18 and the interior annular groove 24 is positioned near the valve receiving end 16. As will be discussed further herein, the valve receiving end 16 is adapted to receive a dental valve (not shown) with the dental valve for receiving an evacuator tip device (not shown) such as a high volume evacuator or a saliva ejector that is used during a dental operation or procedure. The tailpiece receiving end 18 is adapted to receive a tailpiece (not shown) that is connected to a vacuum line or hose (not shown) which is connected to a suction system (also not shown).

The adapter 10 also has an annular lip 28 at the valve receiving end 16 with the annular lip 28 being wider than the body 12. The annular lip 28 has a valve engaging surface 30. An annular chamfered portion 32 is positioned between the annular lip 28 and a first interior surface ring portion 34. The annular chamfered portion 32 helps in guiding a dental valve (not shown) into the adapter 10.

Figure 2:
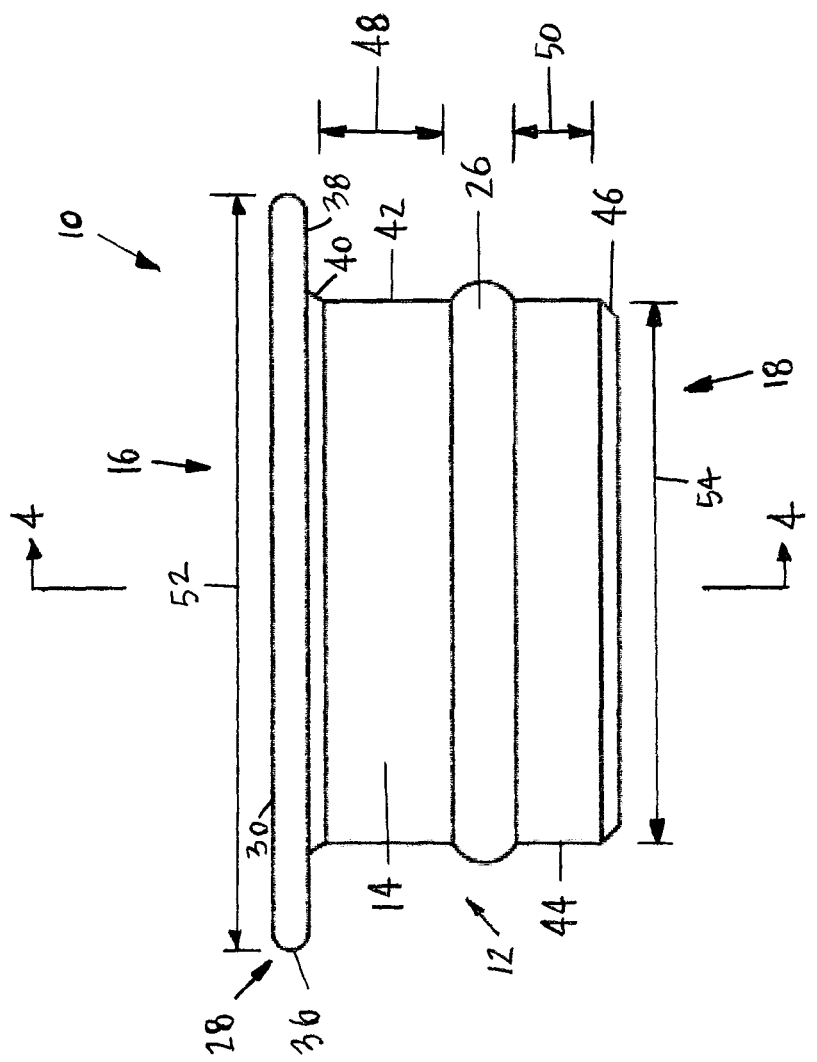
FIG. 2 is a side view of the adapter for a tailpiece for a dental valve constructed according to the present disclosure.

Referring now to FIG. 2, the adapter 10 is shown to comprise the body 12 having the exterior surface 14, the valve receiving end 16, and the tailpiece receiving end 18. The annular lip 28 has a rounded edge 36 between the valve engaging surface 30 and a lower surface 38. An angled section 40 is provided between the lower surface 38 and a first exterior ring section 42. The exterior surface 14 also has the exterior annular rib 26 between the first exterior ring section 42 and a second exterior ring section 44. The tailpiece receiving end 18 also has a chamfered or angled portion 46. The first exterior ring section 42 has a length 48 between the angled section 40 and the exterior annular rib 26. The second exterior ring section 44 has a length 50 between the exterior annular rib 26 and the chamfered portion 46 of the tailpiece receiving end 18. The length 48 is greater than the length 50. The annular lip 28 has a width 52 and the body 12 has a width 54. The width 52 is greater than the width 54. As can be appreciated, the exterior annular rib 26 extends out past the width 54 and does not extend out to the width 52 of annular lip 28.

Figure 3:
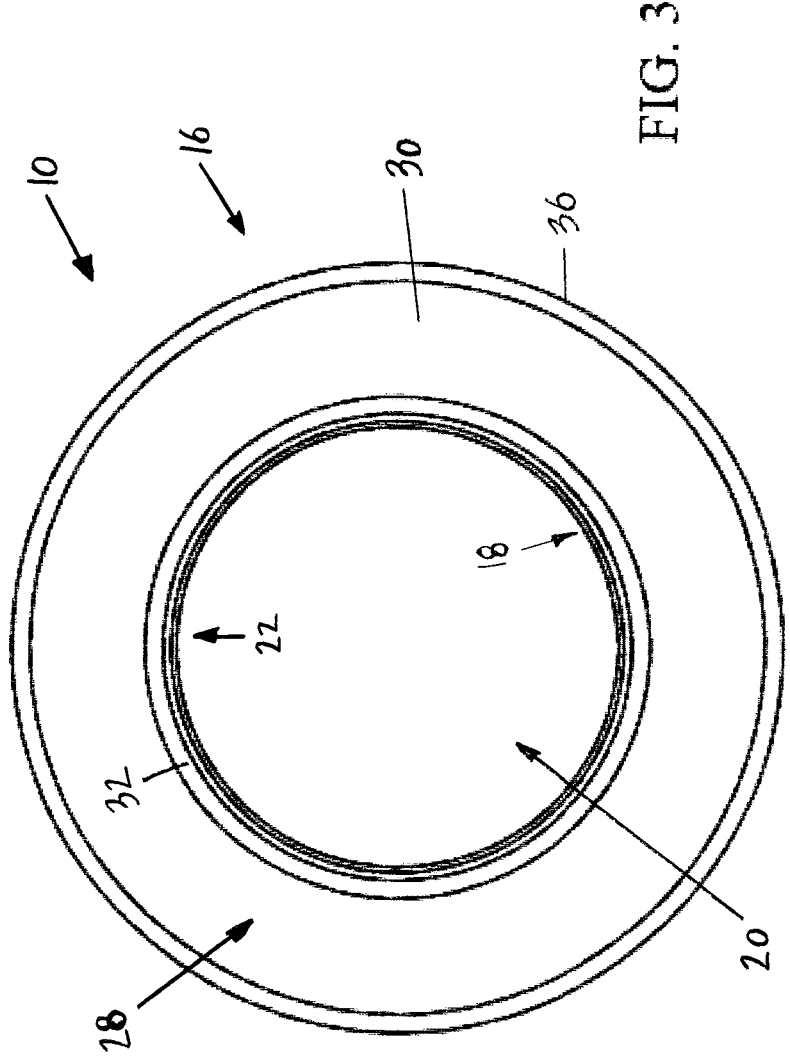
FIG. 3 is a top view of the adapter for a tailpiece for a dental valve constructed according to the present disclosure.

FIG. 3 is a top view of the adapter 10. The adapter 10 is shown to have the valve receiving end 16 having the valve engaging surface 30. The valve engaging surface 30 also has the rounded edge 36. The annular chamfered portion 32 is positioned between the annular lip 28 and the interior surface 22. The lumen 20 is also shown being formed between the valve receiving end 16 and the tailpiece receiving end 18. The lumen 20 is generally circular in shape and cross-section. As will be described more fully herein, the lumen 20 is sized and shaped to receive a dental valve (not shown). The lumen 20 is continuous between the valve receiving end 16 and the tailpiece receiving end 18. This allow for any debris or liquid to pass through the adapter 10 during use, as will be discussed more fully herein.

Figure 4:
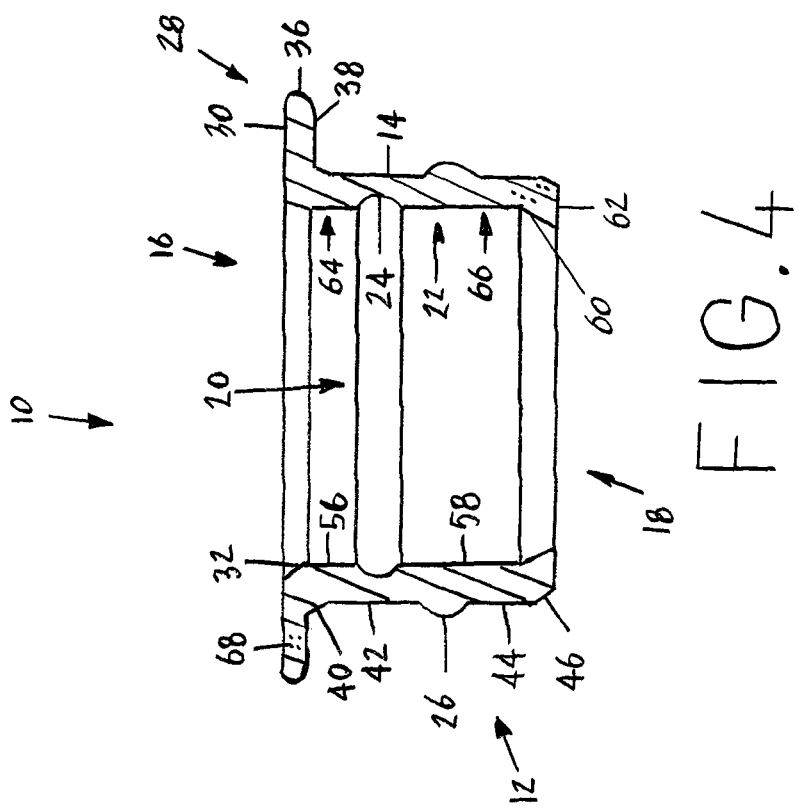
FIG. 4 is a cross-sectional view of the adapter for a tailpiece for a dental valve taken along the plane of line 4-4 in FIG. 2.

With reference now to FIG. 4, a cross-sectional view of the adapter 10 is illustrated. The adapter 10 has the body 12 having the exterior surface 14, the valve receiving end 16, the tailpiece receiving end 18, and the lumen 20 formed between the valve receiving end 16 and the tailpiece receiving end 18. The annular lip 28 has the rounded edge 36 between the valve engaging surface 30 and the lower surface 38. The angled section 40 is provided between the lower surface 38 and the first exterior ring section 42. The exterior surface 14 also has the exterior annular rib 26 between the first exterior ring section 42 and the second exterior ring section 44. The tailpiece receiving end 18 also has the chamfered or angled portion 46. The interior surface 22 is shown having the annular chamfered portion 32, a first interior ring section 56, the interior annular groove 24 formed in the interior surface 22, a second interior ring section 58, and an interior annular chamfered portion 60 adjacent to the tailpiece receiving end 18. The tailpiece receiving end 18 also has a tailpiece engaging surface 62. The first interior ring section 56 has a length 64 between the annular chamfered portion 32 and the interior annular groove 24. The second interior ring section 58 has a length 66 between the interior annular groove 24 and the interior annular chamfered portion 60. The length 64 is greater than the length 66. As can be appreciated, the interior annular groove 24 is positioned near the valve receiving end 16 and the exterior annular rib 26 is positioned near the tailpiece receiving end 18. The adapter 10 may also have an antimicrobial agent 68 incorporated into the adapter 10 or coated on the exterior surface 14 to protect against contamination.

Figure 5:
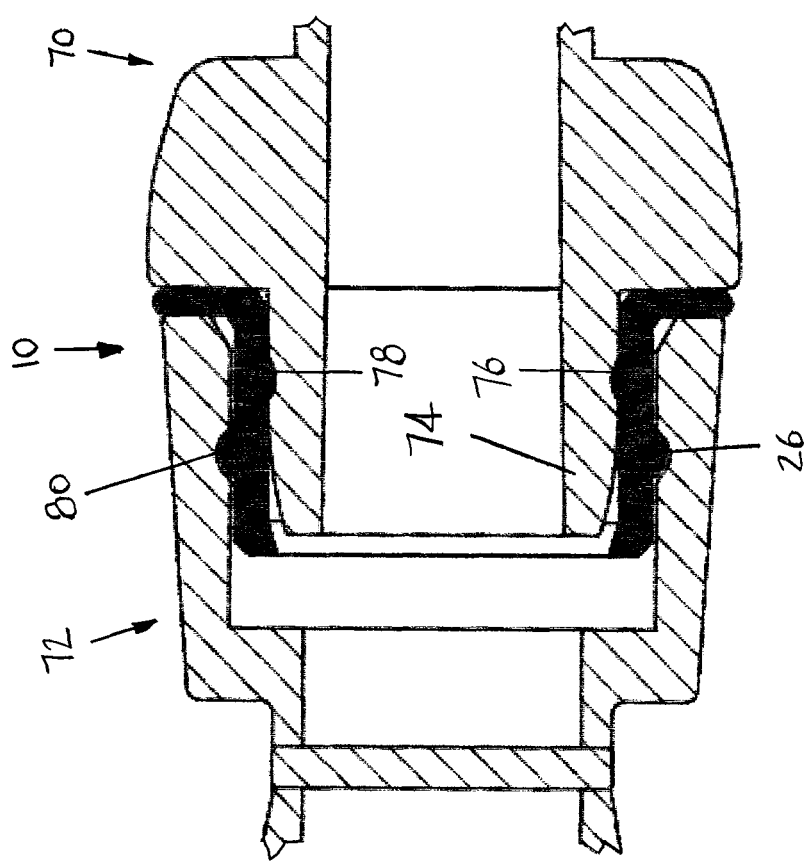
FIG. 5 is a partial cross-sectional view of the adapter for a tailpiece for a dental valve connected to a tailpiece and a dental valve.

FIG. 5 depicts the adapter 10 being positioned between a dental valve device 70 and a tailpiece 72. The adapter 10 is used to mate the dental valve device 70 to the tailpiece 72. The dental valve device 70 has a barbed end 74 that has a groove 76 for receiving an O-ring 78. As should be noted, the interior annular groove 24 is adapted to receive the O-ring 78 to secure the barbed end 74 to the adapter 10 and to provide for an air tight fit between the adapter 10 and the dental valve device 70. The tailpiece 72 has an interior annular groove 80. As should be appreciated, the interior annular groove 80 is adapted to receive the exterior annular rib 26 of the adapter 10. With the use of the adapter 10, a dental valve 70 have any sized barb 74 may be connected to the tailpiece 72.

In operation of the adapter 10, the adapter 10 may be initially inserted into either the dental valve 70 or the tailpiece 72. Once the adapter 10 is inserted, the dental valve 70 and the tailpiece 72 are connected together. As is known, the tailpiece 72 is connected to a hose (not shown) and the hose is connected to a suction system (also not shown). The dental valve 70 also has an evacuator tip (not shown) inserted into the dental valve 70. The evacuator tip may then placed in a mouth of a dental patient during a procedure to remove debris or fluids from the mouth. Once the dental valve 70 is opened, air is allowed to flow through the evacuator tip, the dental valve 70, the adapter 10, the tailpiece 72, the hose, and into the suction system for disposal. When suction is not needed during a dental procedure, the dental valve 70 is closed. Further, once a dental procedure has been completed, the dental valve 70 is closed, removed from the adapter 10, and the dental valve 70 is either discarded or cleaned for use in another dental procedure. A tail cap (not shown) may be inserted over the valve receiving end 16 of the adapter 10 to further silence the suction system once the dental valve 70 has been removed from the adapter 10. As can be appreciated, to begin a new dental procedure, the tail cap is removed from the adapted 10 and a new dental valve 70 is inserted into the adapter 10.

Figure 6:
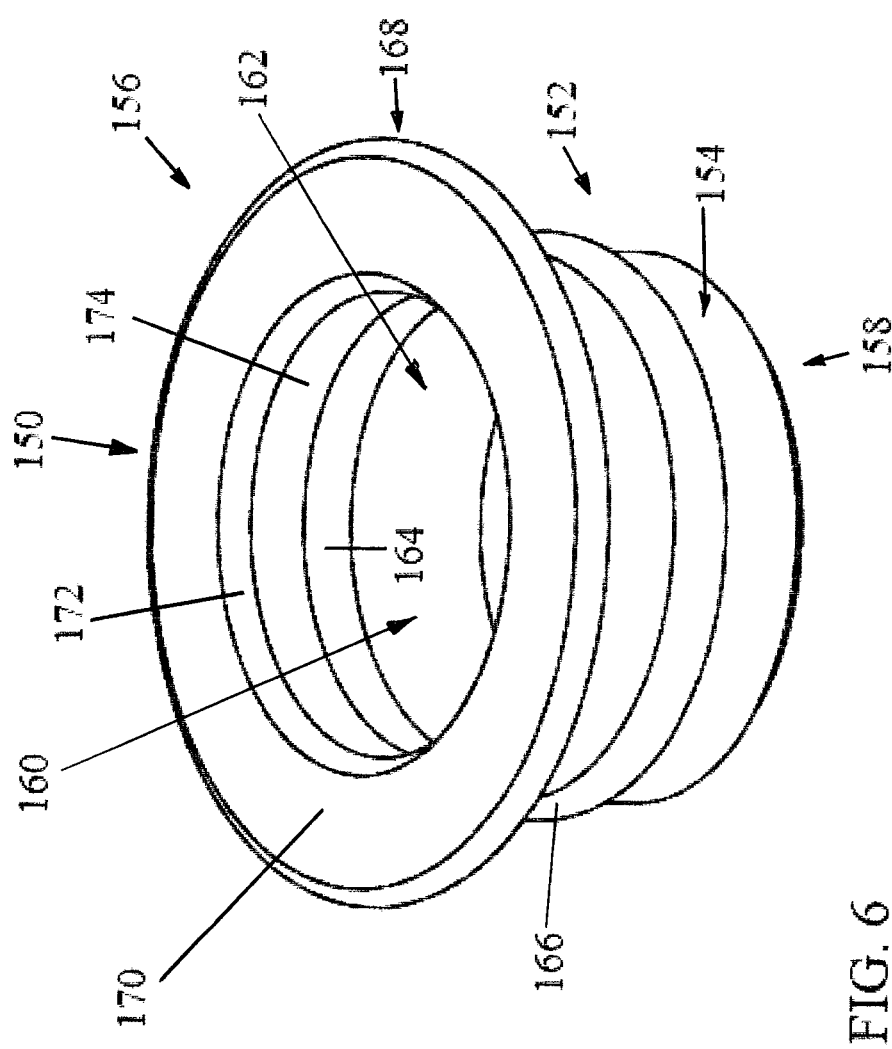
FIG. 6 is a perspective view of another embodiment of an adapter for a tailpiece for a dental valve constructed according to the present disclosure.

FIG. 6 illustrates another embodiment of an adapter 150 for a tailpiece for a dental valve constructed according to the present disclosure. The adapter 150 comprises a body 152 having an exterior surface 154, a valve receiving end 156, a tailpiece receiving end 158 with a lumen or channel 160 formed between the valve receiving end 156 and the tailpiece receiving end 158. The adapter 150 also has an interior surface 162 having an interior annular rib 164 formed in the interior surface 162. An exterior annular rib 166 is formed around the exterior surface 154. The exterior annular rib 166 is positioned near the tailpiece receiving end 158 and the interior annular rib 164 is positioned near the valve receiving end 156. As will be discussed further herein, the valve receiving end 156 is adapted to receive a dental valve (not shown) with the dental valve for receiving an evacuator tip device (not shown) such as a high volume evacuator or a saliva ejector that is used during a dental operation or procedure. The tailpiece receiving end 158 is adapted to receive a tailpiece (not shown) that is connected to a vacuum line or hose (not shown) which is connected to a suction system (also not shown).

The adapter 150 also has an annular lip 168 at the valve receiving end 156 with the annular lip 168 being wider than the body 152. The annular lip 168 has a valve engaging surface 170. An annular interior chamfered portion 172 is positioned between the annular lip 168 and a first interior surface ring portion 174. The annular chamfered portion 172 helps in guiding a dental valve (not shown) into the adapter 150.

Figure 7:
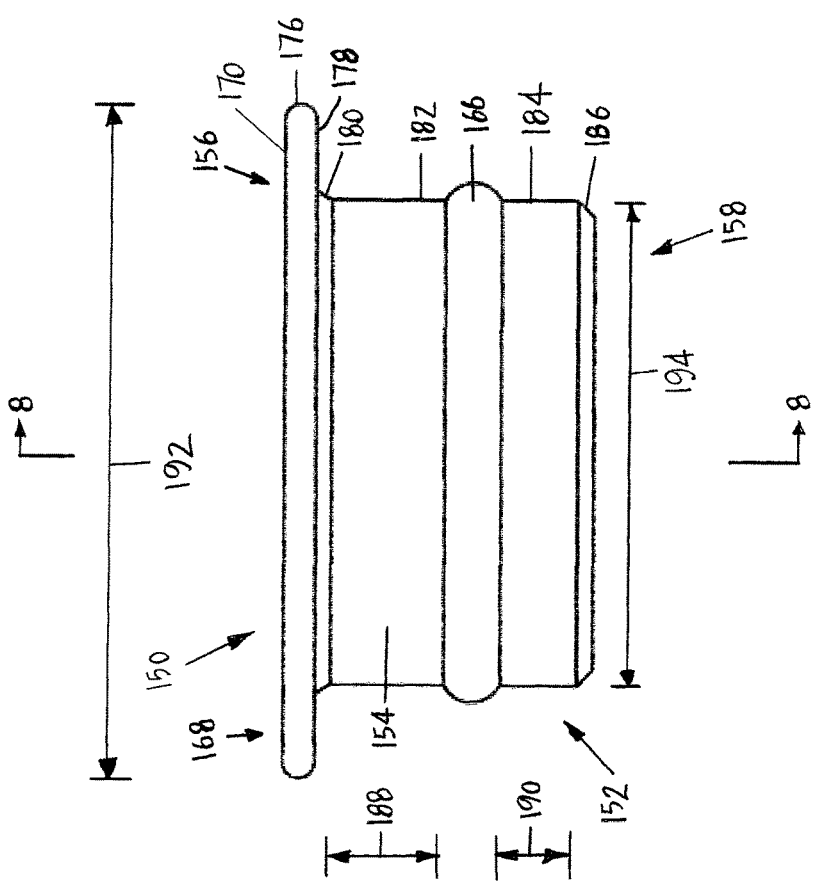
FIG. 7 is a side view of the adapter for a tailpiece for a dental valve shown in FIG. 6 constructed according to the present disclosure.

Referring now to FIG. 7, the adapter 150 is shown to comprise the body 152 having the exterior surface 154, the valve receiving end 156, and the tailpiece receiving end 158. The annular lip 168 has a rounded edge 176 between the valve engaging surface 170 and a lower surface 178. An exterior angled section 180 is provided between the lower surface 178 and a first exterior ring section 182. The exterior surface 154 also has the exterior annular rib 166 between the first exterior ring section 182 and a second exterior ring section 184. The tailpiece receiving end 158 also has an exterior chamfered or angled portion 186. The first exterior ring section 182 has a length 188 between the angled section 180 and the exterior annular rib 166. The second exterior ring section 184 has a length 190 between the exterior annular rib 166 and the chamfered portion 186 of the tailpiece receiving end 158. The length 188 is greater than the length 190. The annular lip 168 has a width 192 and the body 152 has a width 194. The width 192 is greater than the width 194. As can be appreciated, the exterior annular rib 166 extends out past the width 194 and does not extend out to the width 192 of annular lip 168.

Figure 8:
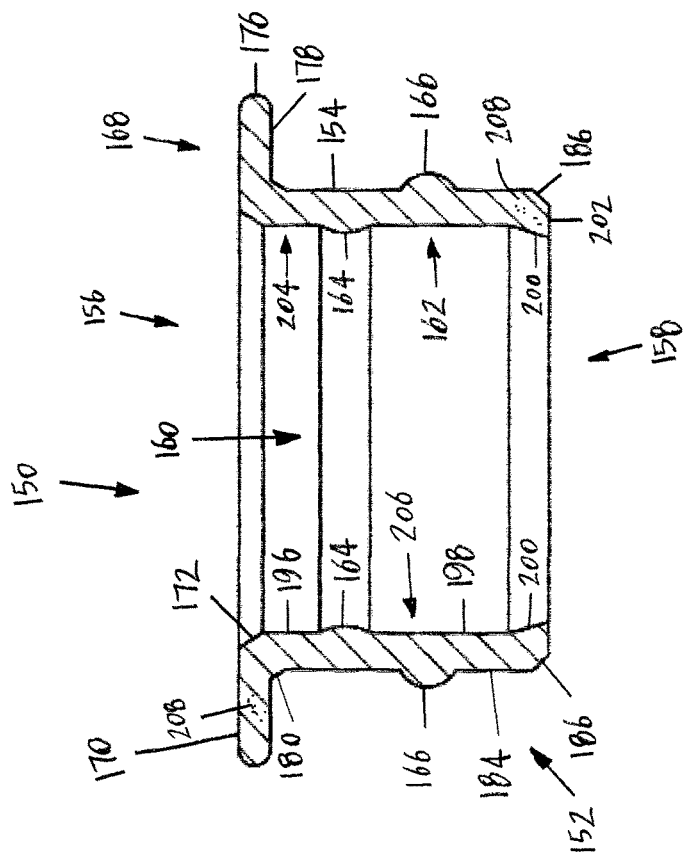
FIG. 8 is a cross-sectional view of the adapter for a tailpiece for a dental valve taken along the plane of line 8-8 in FIG. 7.

With reference now to FIG. 8, a cross-sectional view of the adapter 150 is illustrated. The adapter 150 has the body 152 having the exterior surface 154, the valve receiving end 156, the tailpiece receiving end 158, and the lumen 160 formed between the valve receiving end 156 and the tailpiece receiving end 158. The annular lip 168 has the rounded edge 176 between the valve engaging surface 170 and the lower surface 178. The angled section 180 is provided between the lower surface 178 and the first exterior ring section 182. The exterior surface 154 also has the exterior annular rib 166 between the first exterior ring section 182 and the second exterior ring section 184. The tailpiece receiving end 158 also has the chamfered or angled portion 186. The interior surface 162 is shown having the annular chamfered portion 172, a first interior ring section 196, the interior annular rib 164 formed in the interior surface 162, a second interior ring section 198, and an interior annular chamfered portion 200 adjacent to the tailpiece receiving end 158. The tailpiece receiving end 158 also has a tailpiece engaging surface 202. The first interior ring section 196 has a length 204 between the annular chamfered portion 172 and the interior annular ring 174. The second interior ring section 198 has a length 206 between the interior annular ring 174 and the chamfered portion 200. The length 206 is greater than the length 204. As can be appreciated, the interior annular ring 174 is positioned near the valve receiving end 156 and the exterior annular rib 166 is positioned near the tailpiece receiving end 158. The adapter 150 may also have an antimicrobial agent 208 incorporated into the adapter 150 or coated on the exterior surface 154 to protect against contamination.

Figure 9:
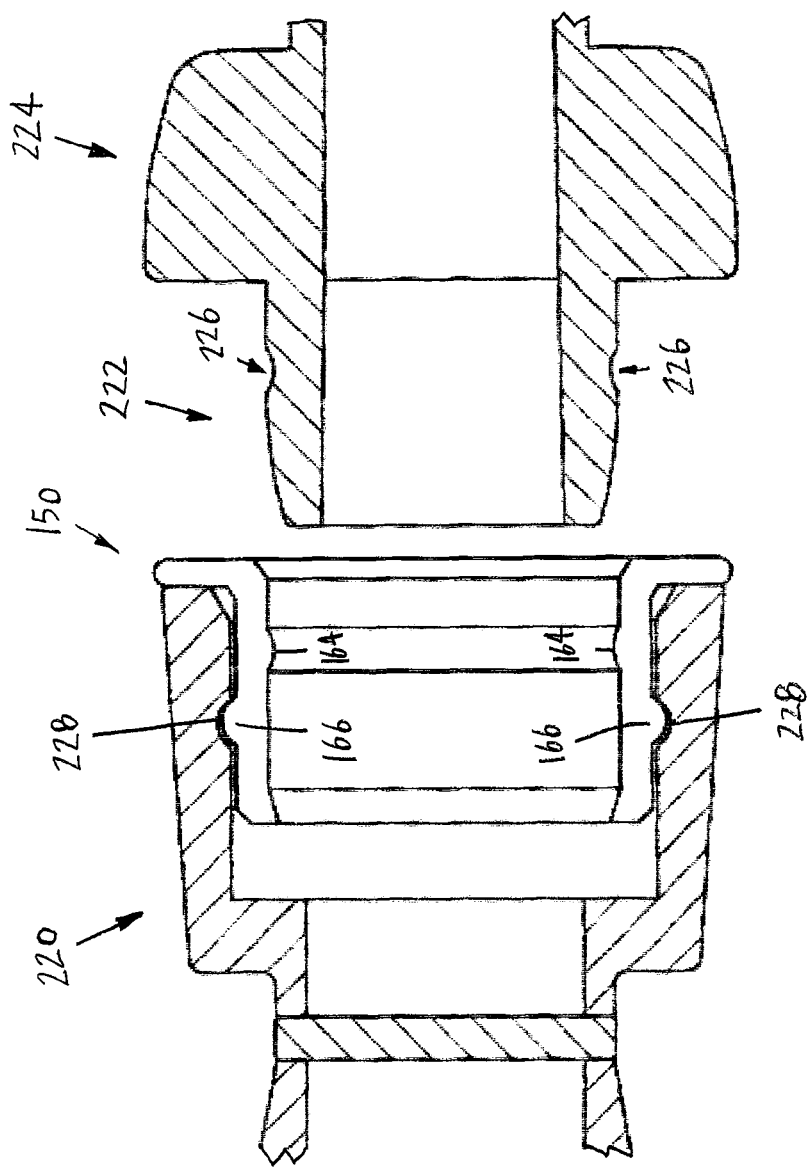
FIG. 9 is a partial cross-sectional view of the adapter for a tailpiece for a dental valve connected to a tailpiece and a dental valve.

FIG. 9 shows the adapter 150 being inserted into a tailpiece 220 ready to receive a barbed end 222 of a dental valve 224. The adapter 150 is used to mate the dental valve device 224 to the tailpiece 220. The dental valve device 224 has the barbed end 222 that has a groove 226 for receiving the interior annular rib 164 to secure the barbed end 222 to the adapter 150 and to provide for an air tight fit between the adapter 150 and the dental valve device 224. The tailpiece 220 has an interior annular groove 228. As should be appreciated, the interior annular groove 228 is adapted to receive the exterior annular rib 166 of the adapter 150. With the use of the adapter 150, any sized barb 222 may be connected to the tailpiece 224. In this particular arrangement, no O-ring is required.

The adapter 150 may be employed in the following manner. The adapter 150 may be initially inserted into either the dental valve 224 or the tailpiece 220. Once the adapter 150 is inserted, the dental valve 224 and the tailpiece 220 are connected together. As is known, the tailpiece 220 is connected to a hose (not shown) and the hose is connected to a suction system (also not shown). The dental valve 224 also has an evacuator tip (not shown) inserted into the dental valve 224. The evacuator tip may then placed in a mouth of a dental patient during a procedure to remove debris or fluids from the mouth. Once the dental valve 224 is opened, air is allowed to flow through the evacuator tip, the dental valve 224, the adapter 150, the tailpiece 220, the hose, and into the suction system for disposal. When suction is not needed during a dental procedure, the dental valve 224 is closed. Further, once a dental procedure has been completed, the dental valve 224 is closed, removed from the adapter 150, and either discarded or cleaned for use in another dental procedure. A tail cap (not shown) may be inserted over the valve receiving end 156 of the adapter 150 to further silence the suction system once the dental valve 224 has been removed from the adapter 150. As can be appreciated, to begin a new dental procedure, the tail cap is removed from the adapted 150 and a new dental valve 224 is inserted into the adapter 150.

The adapters 10 and 150 may be formed of any suitable material such as metal, plastic, polyethylene, high density polyethylene, or any other suitable material. Any suitable material may be used to construct the adapters 10 or 150 so that the adapters 10 or 150 may withstand use in a dental operation or procedure. As has been indicated above, it is also possible and contemplated to incorporate the antimicrobial agent or chemical 68 or 208 in the adapters 10 and 150, respectively, or to provide a coating of an antimicrobial agent on the adapters 10 and 150 to further prevent cross-contamination when using the adapters 10 or 150 during a dental operation or procedure.

From all that has been said, it will be clear that there has thus been shown and described herein an adapter for a tailpiece for a dental valve which fulfills the various advantages sought therefore. It will become apparent to those skilled in the art, however, that many changes, modifications, variations, and other uses and applications of the subject adapter for a tailpiece for a dental valve are possible and contemplated. All changes, modifications, variations, and other uses and applications which do not depart from the spirit and scope of the disclosure are deemed to be covered by the disclosure, which is limited only by the claims which follow.

What is claimed is:

1. An adapter configured to connect a tailpiece to a dental valve comprising: a body having an exterior surface, a valve receiving end, a tailpiece receiving end, a lumen formed between the valve receiving end and the tailpiece receiving end, the lumen having an interior surface, an interior annular groove formed in the interior surface, and an exterior annular rib formed in the exterior surface, an annular lip having a valve engaging surface and a lower surface, a first interior annular chamfered portion positioned along the interior surface between the annular lip and a first interior surface ring portion, the first interior surface ring portion positioned along the interior surface between the first interior annular chamfered portion and the interior annular groove, a second interior annular chamfered portion adjacent to the tailpiece receiving end and positioned between the tailpiece receiving end and a second interior surface ring portion, the second interior surface ring portion positioned along the interior surface between the second interior annular chamfered portion and the interior annular groove, a first exterior angled section positioned between the lower surface and a first exterior ring section with the first exterior angled section being offset from the first interior annular chamfered portion, with the exterior annular rib being positioned near the tailpiece receiving end and the interior annular groove being positioned near the valve receiving end.

2. The adapter for a tailpiece for a dental valve of claim 1 wherein the first interior surface ring portion has a length and the second interior surface ring portion has a length and the length of the second interior surface ring portion is greater than the first interior surface ring portion.

3. The adapter for a tailpiece for a dental valve of claim 1 further comprising a second exterior ring section with the first exterior ring section having a length and the second exterior ring section having a length with the length of the first exterior ring section being greater than the length of the second exterior ring section.

4. The adapter for a tailpiece for a dental valve of claim 1 wherein the annular lip comprises a rounded edge between the valve engaging surface and the lower surface.

5. The adapter for a tailpiece for a dental valve of claim 1 further comprising a second annular chamfered portion positioned on the exterior surface of the lumen between the tailpiece receiving end and a second exterior surface ring portion.

6. The adapter for a tailpiece for a dental valve of claim 1 wherein the adapter is constructed of plastic.

7. The adapter for a tailpiece for a dental valve of claim 1 further comprising an antimicrobial agent incorporated into the adapter.

8. An adapter configured to connect a tailpiece to a dental valve comprising: a body having an exterior surface, a valve receiving end, a tailpiece receiving end, a lumen formed between the valve receiving end and the tailpiece receiving end, the lumen having an interior surface, an interior annular rib formed in the interior surface, and an exterior annular rib formed in the exterior surface, an annular hp having a valve engaging surface and a lower surface, a first interior annular chamfered portion positioned along the interior surface between the annular hp and a first interior surface ring portion, the first interior surface ring portion positioned along the interior surface between the first interior annular chamfered portion and the interior annular rib, a second interior annular chamfered portion adjacent to the tailpiece receiving end and positioned between the tailpiece receiving end and a second interior surface ring portion, the second interior surface ring portion positioned along the interior surface between the second interior annular chamfered portion and the interior annular rib, a first exterior angled section positioned between the lower surface and a first exterior ring section with the first exterior angled section being offset from the first interior annular chamfered portion, with the exterior annular rib being positioned near the tailpiece receiving end and the interior annular rib being positioned near the valve receiving end.

9. The adapter for a tailpiece for a dental valve of claim 8 wherein the first interior surface ring portion has a length and the second interior surface ring portion has a length and the length of the second interior surface ring portion is greater than the first interior surface ring portion.

10. The adapter for a tailpiece for a dental valve of claim 8 further comprising a second exterior ring section with the first exterior ring section having a length and the second exterior ring section having a length with the length of the first exterior ring section being greater than the length of the second exterior ring section.

11. The adapter for a tailpiece for a dental valve of claim 8 wherein the annular lip comprises a rounded edge between the valve engaging surface and the lower surface.

12. The adapter for a tailpiece for a dental valve of claim 8 further comprising a second annular chamfered portion positioned on the exterior surface of the lumen between the tailpiece receiving end and a second exterior surface ring portion.

13. The adapter for a tailpiece for a dental valve of claim 8 wherein the adapter is constructed of plastic.

14. The adapter for a tailpiece for a dental valve of claim 8 further comprising an antimicrobial agent incorporated into the adapter.

15. An adapter configured to connect a tailpiece to a dental valve comprising: a body having an exterior surface having a first exterior ring section, an exterior annular rib, and a second exterior ring section;
a valve receiving end having an annular lip having a valve engaging surface and a lower surface;
a tailpiece receiving end having a chamfered portion;
a lumen formed between the valve receiving end and the tailpiece receiving end having an interior annular groove;
and the body further having an interior surface having a first interior annular chamfered portion positioned along the interior surface between the annular lip and a first interior surface ring portion, the first interior surface ring portion positioned along the interior surface between the first interior annular chamfered portion and the interior annular groove, a second interior annular chamfered portion adjacent to the tailpiece receiving end and positioned between the tailpiece receiving end and a second interior surface ring portion, the second interior surface ring portion positioned along the interior surface between the second interior annular chamfered portion and the interior annular groove, a first exterior angled section positioned between the lower surface and a first exterior ring section with the first exterior angled section being offset from the first interior annular chamfered portion, with the exterior annular rib being positioned near the tailpiece receiving end and the interior annular groove being positioned near the valve receiving end.

16. The adapter for a tailpiece for a dental valve of claim 15 wherein the annular lip further comprises a rounded edge between the valve engaging surface and the lower surface.

17. The adapter for a tailpiece for a dental valve of claim 15 wherein the first exterior ring section has a length and the second exterior ring section has a length and the length of the first exterior ring section is greater than the length of the second exterior ring section.

18. The adapter for a tailpiece for a dental valve of claim 15 wherein the first interior ring section has a length and the second interior ring section has a length and the length of the second interior ring section is greater than the length of the first interior ring section.

19. The adapter for a tailpiece for a dental valve of claim 15 further comprising a second annular chamfered portion positioned on the exterior surface of the lumen between the tailpiece receiving end and a second exterior surface ring portion.

20. The adapter for a tailpiece for a dental valve of claim 15 wherein the annular lip has a width and the body has a width with the width of the annular lip being greater than the width of the body and the exterior annular rib extends out past the width of the body and does not extend out to the width of annular lip.

* * * * *